(12) United States Patent
Brandt et al.

(10) Patent No.: US 7,197,284 B2
(45) Date of Patent: Mar. 27, 2007

(54) ANTENNA SWITCHES INCLUDING FIELD EFFECT TRANSISTORS

(75) Inventors: Per-Olof Brandt, Lomma (SE); Jesper Olsander, Malmo (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 547 days.

(21) Appl. No.: 10/423,195

(22) Filed: Apr. 25, 2003

(65) Prior Publication Data

US 2004/0214530 A1    Oct. 28, 2004

(51) Int. Cl.
- H04B 1/44     (2006.01)
- H04B 1/40     (2006.01)
- H04M 1/00     (2006.01)
- H01P 1/10     (2006.01)

(52) U.S. Cl. .................. 455/78; 455/82; 455/83; 455/84; 455/553; 455/572; 333/104; 333/262; 333/132; 333/167

(58) Field of Classification Search .............. 455/78, 455/82, 83, 84, 553, 572; 333/104, 262, 333/132, 167

See application file for complete search history.

(56) References Cited

U.S. PATENT DOCUMENTS

| | | | |
|---|---|---|---|
| 5,442,812 A | 8/1995 | Ishizaki et al. | |
| 5,969,561 A | 10/1999 | McGillan | |
| 6,009,314 A | 12/1999 | Bjork et al. | |
| 6,332,071 B1 * | 12/2001 | Brandt | 455/82 |
| 6,882,829 B2 * | 4/2005 | Mostov et al. | 455/83 |
| 2002/0006810 A1 | 1/2002 | Schiller | |
| 2002/0086644 A1 | 7/2002 | Koskinen | |

FOREIGN PATENT DOCUMENTS

| | | |
|---|---|---|
| EP | 0641090 | 3/1995 |
| EP | 0978949 | 2/2000 |
| GB | 2375905 A | 11/2002 |
| JP | 9284170 | 10/1997 |
| WO | WO 99/46859 | 9/1999 |
| WO | WO 02/069435 A1 | 2/2002 |
| WO | WO 02/067451 A1 | 8/2002 |

OTHER PUBLICATIONS

International Search report corresponding to PCT/EP2004/002019.
Madihian, et al., "CMOS RF Ics for 900MHz-2.4GHz Band Wireless Communication Networks", 1999 IEEE Radio Frequency Integrated Circuits Symposium, pp. 12-16, no month.

(Continued)

*Primary Examiner*—Matthew D. Anderson
*Assistant Examiner*—Yuwen Pan
(74) *Attorney, Agent, or Firm*—Michael Cameron, Esq.

(57) ABSTRACT

The present invention provides a transceiver circuit that includes a transmission amplifier coupled with an antenna input/output node. The transmission amplifier is configured to amplify communications to be transmitted from the transceiver circuit. The transceiver circuit further includes a receiver and a field effect transistor. The receiver includes a receiver input coupled with the antenna input/output node. The field effect transistor is coupled between the receiver input and an electrical reference. The field effect transistor is configured to provide an open circuit when communications are received at the receiver input and to provide a closed circuit when communications are not being received at the receiver input.

21 Claims, 8 Drawing Sheets

OTHER PUBLICATIONS

Yamamoto, et al., "A 2.4-GHz-Band 1.8-V Operation Single-Chip Si-CMOS T/R-MMIC Front-End with a Low Insertion Loss Switch", IEEE Journal of Solid-State Circuits, vol. 36, No. 8, Aug. 2001.

Komurasaki, et al., "2.4-GHz-Band CMOS RF Front-End Building Blocks at a 1.8-V Supply", IEICE Trans. Fundamentals, vol. E85-A, No. 2, Feb. 2002, pp. 300-308.

Donnay, et al., "Single-Chip versus Single-Package Radios", IMEC, DESICS, (4 sheets).

Atmel Corporation, "Atmel provides it's highly integrated RF SiGe front end for ISM and Bluetooth systems now in Flipchip technology", http://www.atmel.com/atmel/news/20010510.htm, dated May 10, 2001, (2 sheets).

* cited by examiner

ANTENNA SWITCHES INCLUDING FIELD EFFECT TRANSISTORS

FIELD OF THE INVENTION

The present invention relates generally to wireless communications, and more particularly, to antenna switches.

BACKGROUND OF THE INVENTION

Recently, the demand for small, integrated wireless devices has increased. Unfortunately, integration of better performance, more functions and more services in a single wireless device does not naturally lend itself to the simultaneous reduction in size of the device. As a result, manufactures and developers of wireless devices are constantly trying to manipulate more components into smaller housings by, for example, decreasing the size of the existing components. Furthermore, as the number of components in the device increase, the lack of space inside the housing may cause increased electrical losses.

Conventional wireless terminals are typically equipped with a switching circuit that enables the wireless terminal to switch between a transmitting mode and a receiving mode of the wireless terminal, i.e. an antenna switch. The operations of conventional antenna switches are typically divided into two separate stages provided by two separate components disposed within the wireless terminal. The first stage is an amplification stage of the antenna switch provided by, for example, a power amplifier, and the second stage is the switching stage of the antenna switch that switches between a transmitting mode and a receiving mode of an antenna associated with the antenna switch.

SUMMARY OF THE INVENTION

According to some embodiments of the present invention a transceiver circuit includes a transmission amplifier coupled with an antenna input/output node. The transmission amplifier is configured to amplify communications to be transmitted from the transceiver circuit. The transceiver circuit further includes a receiver and a field effect transistor. The receiver includes a receiver input coupled with the antenna input/output node. The field effect transistor is coupled between the receiver input and an electrical reference. The field effect transistor is configured to provide an open circuit when communications are received at the receiver input and to provide a closed circuit when communications are not being received at the receiver input.

According to additional embodiments of the present invention the transceiver circuit includes an isolation device coupled between a transmission amplifier and an antenna input/output node and between the transmission amplifier and a receiver input. A bias circuit is coupled to the antenna input/output node. The bias circuit is configured to provide a low impedance at the isolation device when transmitting communications from the transmission amplifier and to provide a high impedance at the isolation device when communications are not being transmitted from the transmission amplifier.

DETAILED DESCRIPTION OF EMBODIMENTS OF THE PRESENT INVENTION

The present invention will now be described more fully with reference to the accompanying drawings, in which embodiments of the invention are shown. This invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, when an element is referred to as being "coupled" or "connected" to another element, it can be directly coupled or connected to the other element or intervening elements may be present. In contrast, when an element is referred to as being "directly coupled" or "directly connected" to another element, there are no intervening elements present. Like reference numerals refer to like elements throughout.

Embodiments of the present invention will now be described below with reference to FIGS. 1 through 10. Embodiments of the present invention provide an antenna switch that may be integrated on a same integrated circuit chip, such as a same integrated circuit semiconductor substrate, with an amplifier for use in communications devices, for example, wireless terminals. In particular, an antenna switch can be provided including a field effect transistor (FET) configured to switch a wireless terminal from transmitting communications from a transmission amplifier to receiving communications at a receiver. FETs configured as switches according to some embodiments of the present invention are activated and/or deactivated responsive to a voltage control signal, unlike switching circuits used in conventional antenna switches, for example, PIN diodes, that are activated and/or deactivated responsive to current control signals. An exemplary device that uses, for example, PIN diodes, as switches in an antenna device is discussed in U.S. Pat. No. 6,332,071 to Brandt, the disclosure of which is hereby incorporated herein by reference as if set forth in its entirety. Antenna switches according to some embodiments of the present invention operate responsive to a voltage control signal such that the switches may not draw significant current, these devices may have improved performance characteristics relative to conventional antenna switches. According to some embodiments of the present invention, switches may be combined with transmission amplifiers on a single chip, thus, providing a smaller, integrated package that may be more cost effective relative to existing antenna switches.

Further embodiments of the present invention relate to biasing an isolation circuit, for example, a PIN diode, included in the wireless terminal to allow a radio frequency (RF) signal to flow from the transmission amplifier to the antenna when transmitting communications from the transmission amplifier.

Figures 1, 2:
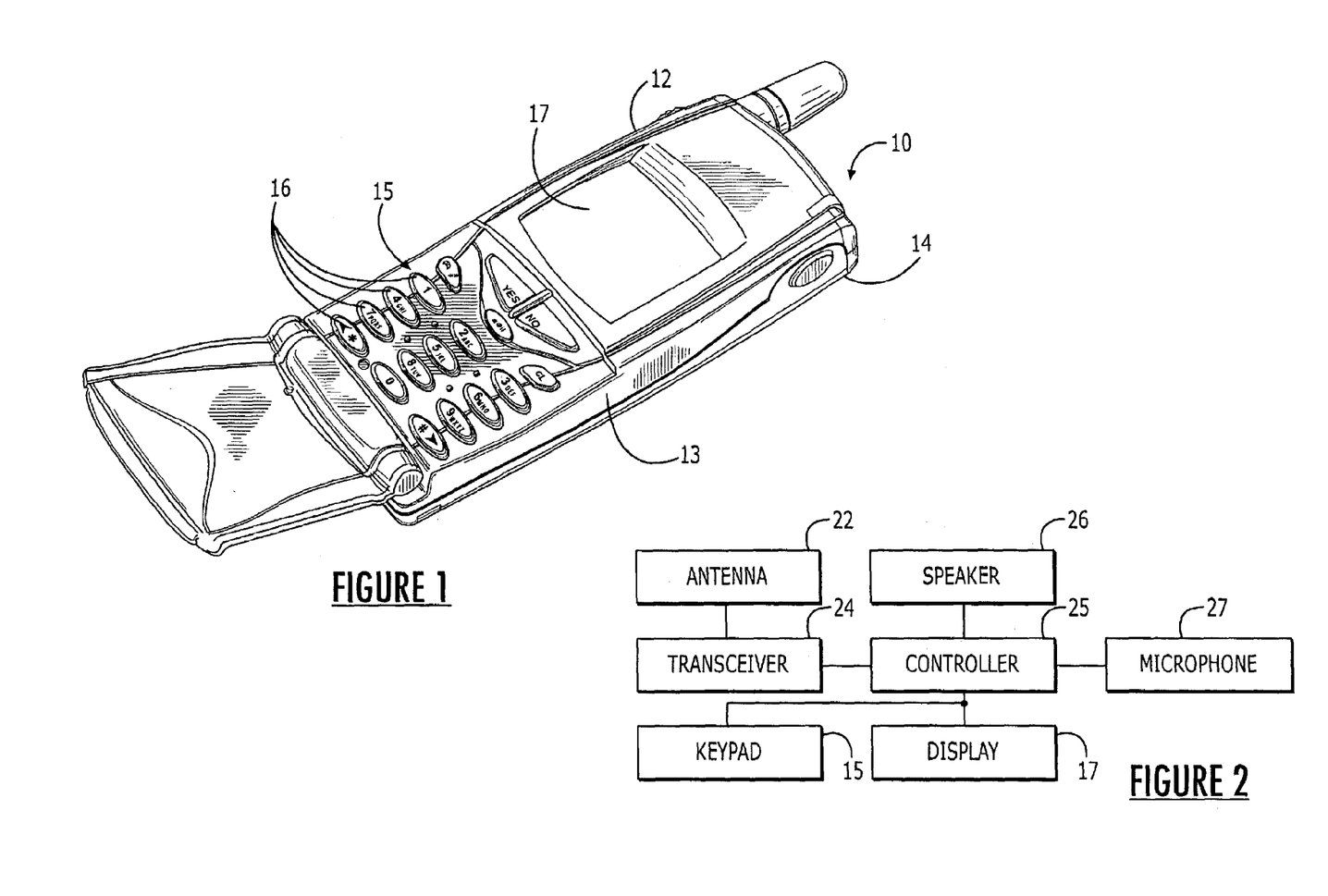
FIG. 1 is a perspective view of wireless terminals according to some embodiments of the present invention.
FIG. 2 is a schematic block diagram of an arrangement of electronic components within the wireless terminal of FIG. 1 according to some embodiments of the present invention.

Antenna switches including field effect transistors (FETs) according to some embodiments of the present invention may be incorporated into a wireless terminal, for example, a wireless terminal 10 illustrated in FIG. 1. As used herein, the term "mobile terminal" or "wireless terminal" may include a cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; and/or a conventional laptop and/or palmtop receiver or other appliance that includes a wireless transceiver.

As illustrated, the wireless terminal 10 may include a housing 12. The housing 12 may include a top portion 13 and a bottom portion 14 connected to the top portion 13, thus forming a cavity therein. The top and bottom housing portions 13, 14 may house a user interface 15, which may include a plurality of keys 16, a display 17, and/or electronic components (not shown) that enable the wireless terminal 10 to transmit and receive communications signals.

It will be understood that, although antenna switches according to some embodiments of the present invention are described herein with respect to wireless terminals, embodiments of the present invention are not limited to such a configuration. For example, antenna switches according to some embodiments of the present invention may be used within fixed terminals, for example, base stations for a wireless communications system.

Referring now to FIG. 2, an arrangement of electronic components that enable a wireless terminal to transmit and receive wireless terminal communication signals according to some embodiments of the present invention will be discussed below. As illustrated, an antenna 22 for receiving and/or transmitting wireless terminal communication signals is electrically connected to a radio-frequency (RF) transceiver 24 that is further electrically connected to a controller 25, such as a microprocessor. The controller 25 is electrically connected to a speaker 26 that is configured to transmit a signal from the controller 25 to a user of a wireless terminal. The controller 25 is also electrically connected to a microphone 27 that receives a voice signal from a user and transmits the voice signal through the controller 25 and transceiver 24 to a remote device. The controller 25 is electrically connected to the keypad 15 and the display 17 that facilitate wireless terminal operation. Antenna switches according to some embodiments of the present invention may be incorporated into a transceiver of a wireless terminal, for example, transceiver 24 of FIG. 2.

It will be understood by those having skill in the art of communications devices that an antenna is a device that may be used for transmitting and/or receiving electromagnetic signals. During transmission, an antenna may accept energy from a transmission line and radiate this energy into space. During reception, an antenna may gather energy from an incident wave and provide this energy to a transmission line. The amount of power radiated from or received by an antenna is typically represented as a gain.

Figure 3:
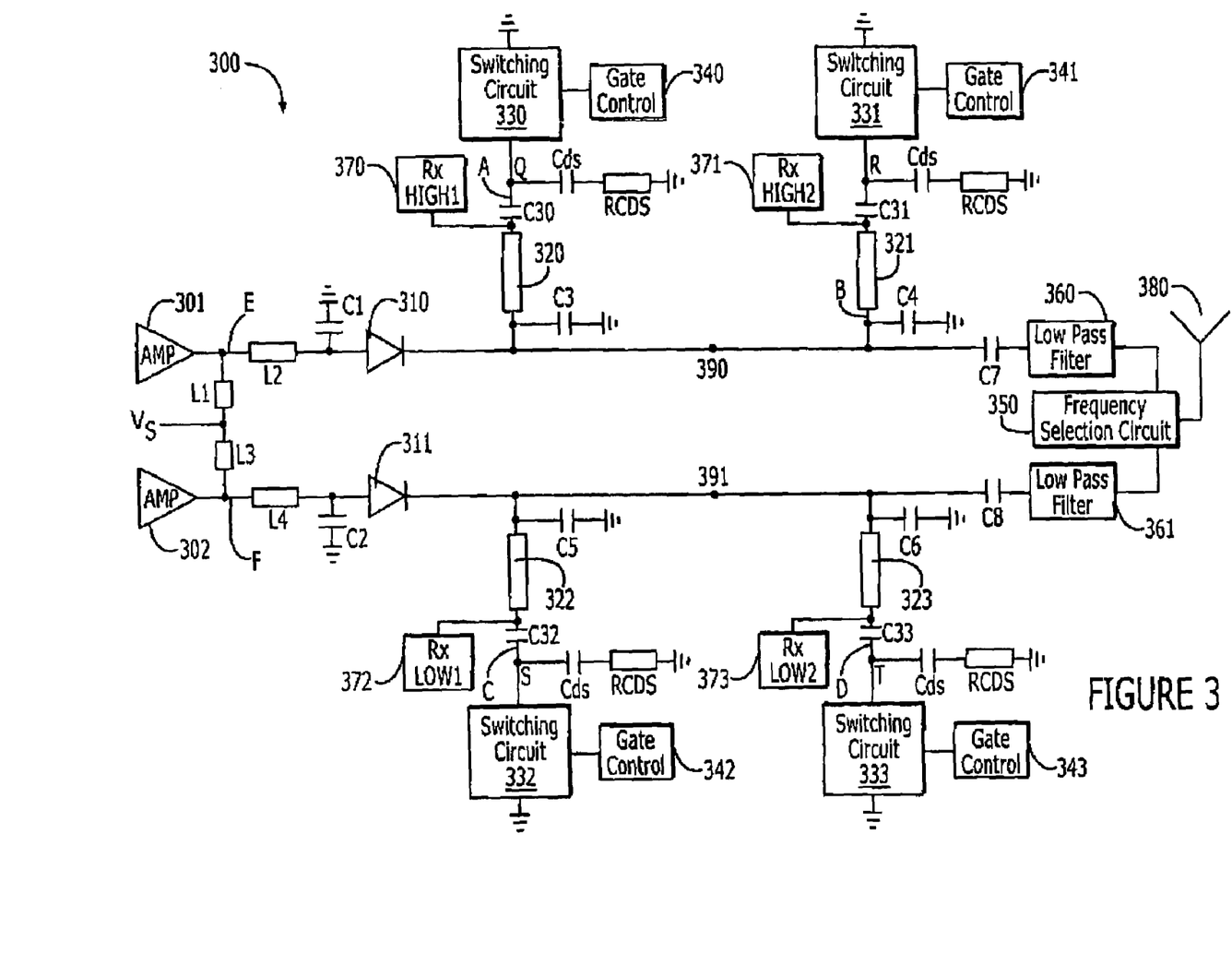
FIG. 3 is a block diagram of transceivers according to some embodiments of the present invention.

Referring now to FIG. 3, a block diagram of a transceiver 300 including an antenna switch according to some embodiments of the present invention will be discussed. It will be understood that a transceiver according to embodiments of the present invention may be incorporated into, for example, digital complementary metal-oxide semiconductor (CMOS) chips, radio frequency(RF)-ASICs, CMOS control ASICs, and the like without departing from the teachings of the present invention. As illustrated in FIG. 3, four receiver signal paths A, B, C and D are connected to a frequency selection circuit 350. Each of the four receive signal paths may be dedicated to a different band of frequencies. For example, signal paths A and B may be dedicated for signals having high frequency bands, for example, an 1800 MHz frequency band. The 1800 MHz frequency band may correspond to frequencies allocated to the personal communications system (PCS) code division multiple access (CDMA) band. Accordingly, the first high band signal path A may be allocated to a first group of channels in the PCS CDMA band and the second high band path B may be allocated to a second group of channels in the PCS CDMA band. Similarly, signal paths C and D may be dedicated for signals having low frequency bands, for example, an 800–830 MHz frequency band. The 800–830 MHz frequency band is allocated to cellular CDMA. Accordingly, the first low band signal path C may be allocated the 800–815 MHz frequency band of the cellular CDMA channels and the second low band signal path D may be allocated the 815–830 frequency band of cellular CDMA channels. It will be understood that these frequencies are provided for exemplary purposes only and that embodiments of the present invention are not limited to these frequencies.

The frequency selection circuit 350 is coupled to an antenna 380. The frequency selection circuit 350 is further coupled between a first antenna input/output node 390 and a second input/output node 391. The frequency selection circuit is configured to couple frequencies of a first frequency band to/from the first antenna input/output node 390 and to couple frequencies in a second frequency band to/from the second antenna input/output node 391. The use of the frequency selection circuit 350 may, for example, allow the antenna switch to support a multi band antenna. The frequency selection circuit 350 may be, for example, a diplexer, which can be implemented as a series of filters configured to pass certain bands of frequencies.

As discussed above, the upper two receiver signal paths A and B and the first transmitter signal path E of a first transmission amplifier 301 are coupled to a first antenna input/output node 390. Similarly, the lower two receiver signal paths C and D and the second transmitter signal path F of a second transmission amplifier 302 are coupled to a second antenna input/output node 391.

The first and second high band receiver signal paths A and B will be discussed simultaneously because they include similar components. It will be understood that the components in the first and second high band receiver signal paths A and B may have different values to compensate for the different frequencies associated with each path. As illustrated in FIG. 3, the components and blocks of receiver signal paths A and B are all coupled to a first antenna input/output node 390. As further illustrated in FIG. 3, the first transmitter path E is also coupled to the first antenna input/output node 390. It will be understood that the first transmission amplifier 301 may be coupled to additional circuitry that interfaces/communicates with other components located in the mobile terminal, for example, a controller 25 of FIG. 2. The first transmission amplifier 301 is configured to amplify communications to be transmitted from the wireless terminal.

The output terminal of the first transmission amplifier 301 can be connected to a first terminal of an inductive element L2. The second terminal of the inductive element L2 can be connected to the first terminal of capacitor C1 and a second terminal of capacitor C1 can be connected to an electrical reference, for example, ground. As used herein, an electrical reference may include a positive voltage, a negative voltage, ground or the like. Furthermore, the first amplifier 301 may be fed by supply voltage $V_s$ via a high value inductive element L1. $V_s$ may be, for example, the voltage of a battery powering the wireless terminal.

The second terminal of the inductive element L2 and the first terminal of the capacitor C1 can also be connected to an isolation device, for example, first PIN diode 310. The first PIN diode 310 may, for example, isolate the first transmission amplifier 301 from the antenna input/output node 390 when the wireless terminal is receiving communications at a receiver 370 or 371. In other words, the first PIN diode 310 may act as a transmit switch. It will be understood that although the isolation device is illustrated herein as a PIN diode, the isolation device is not limited to this configuration. For example, the isolation device may be implemented by, for example, a transmission line or an inductive element, without departing from the teachings of the present invention.

The output terminal of the PIN diode 310 is connected to the antenna input/output node 390. The capacitor C7 and the low pass filter 360 can be connected in series between the antenna input/output node 390 and the frequency selection circuit 350. A capacitor C3, C4 is connected between the antenna input/output node and ground. A transmission line 320, 321 and a capacitor C30, C31 are connected in series with a capacitor Cds between the antenna input/output node 390 and ground. Transmission line 320, 321 may, for example, be ¼ of the wavelength (or any multiples of ¼ of the wavelength) in the high band. It will be understood that transmission lines according to some embodiments of the present invention may include, for example, microstrips, inductive elements and the like.

The transmission line 320, 321 and a switching circuit 330, 331 are connected in series between the antenna input/output node 390 and an electrical reference such as ground. The switching circuit 330, 331 operates responsive to control signals from gate controller 340, 341 and an input of a receiver 370, 371 is coupled to a capacitor C30, C31 between the transmission line 320, 321 and the switching circuit 330, 331. It will be understood that the receiver 370, 371 may be a receiver port that includes circuitry tat enables the communicated signal to be received by the wireless terminal receiver and interface with additional circuitry in the wireless terminal, for example, a controller 25 of FIG. 2. The switching circuit 330, 331 enables the wireless terminal to switch between receiving communications at the receiver 370, 371 and transmitting communications from the transmission amplifier 301. It will be understood that wireless terminals according to some embodiments of the present invention may also be idle, i.e not transmitting or receiving communications. In embodiments where the wireless terminal is idle, the switching circuit 330,331 may be configured as if it were transmitting information from the transmission amplifier. Switching circuits according to some embodiments of the present invention will be discussed further below with respect to FIG. 6.

The first and second low band receiver signal paths C and D will be discussed simultaneously because they include similar components. It will be understood that the components in the first and second low band receiver signal paths C and D may have different values to compensate for the different frequencies that are associated with each path. As illustrated in FIG. 3, the components and blocks of signal paths C and D are all coupled to a second antenna input/output node 391. As further illustrated in FIG. 3, the second transmitter path F is also coupled to the second antenna input/output node 391. It will be understood that the second transmission amplifier 302 may be coupled to additional circuitry that interfaces/communicates with other components located in the mobile terminal, for example, the controller 25 of FIG. 2. The second transmission amplifier 302 is configured to amplify communications to be transmitted from the wireless terminal.

The output terminal of the second transmission amplifier 302 can be connected to a first terminal of an inductive element L4. The second terminal of the inductive element L4 can be connected to the first terminal of capacitor C2 and a second terminal of capacitor C2 can be connected to an electrical reference, for example, ground. As used herein, an electrical reference may include a positive voltage, a negative voltage, ground or the like. Furthermore, the second amplifier 302 may be fed by supply voltage $V_s$ via a high value inductive element L3. $V_s$ may be, for example, the voltage of a battery powering the wireless terminal.

The second terminal of the inductive element L4 and the first terminal of the capacitor C2 can also be connected to an isolation device, for example, second PIN diode 311. The second PIN diode 311 may, for example, isolate the second transmission amplifier 302 from the antenna input/output node 391 when the wireless terminal is receiving communications at a receiver 372 or 373. In other words, the second PIN diode 311 may act as a transmit switch. It will be understood that although the isolation device is illustrated herein as a PIN diode, the isolation device is not limited to this configuration. For example, the isolation device may be implemented by, for example, a transmission line or an inductive element, without departing from the teachings of the present invention.

The output terminal of the PIN diode 311 is connected to the antenna input/output node 391. The capacitor C8 and the low pass filter 361 can be connected in series between the antenna input/output node 391 and the frequency selection circuit 350. A capacitor C5, C6 is connected between the antenna input/output node and ground. A transmission line 322, 323 and a capacitor C32, C33 are connected in series with a capacitor Cds between the antenna input/output node 391 and an electrical reference such as ground. Transmission line 322, 323 may, for example, be ¼ of the wavelength (or multiples thereof) in the low band. It will be understood that transmission lines according to some embodiments of the present invention may include, for example, microstrips, inductive elements and the like.

The transmission line 322, 323 and a switching circuit 332, 333 are connected in series between the antenna input/output node 391 and an electrical reference such as ground. The switching circuit 332, 333 operates responsive to control signals from gate controller 342, 343 and an input of a receiver 372, 373 is coupled to a capacitor C32, C33 between the transmission line 322, 323 and the switching circuit 332, 333. It will be understood that the receiver 372, 373 may be a receiver port that includes circuitry that enables the communicated signal to be received by the wireless terminal receiver and interface with additional circuitry in the wireless terminal, for example, a controller 25 of FIG. 2. The switching circuit 322, 323 enables the wireless terminal to switch between receiving communications at the receiver 372, 373 and transmitting communications from the transmission amplifier 302. It will be understood that wireless terminals according to some embodiments of the present invention may also be idle, i.e. not transmitting or receiving communications. In embodiments where the wireless terminal is idle, the switching circuit 332, 333 may be configured as if it were transmitting information from the transmission amplifier. Switching circuits according to some embodiments of the present invention will be discussed further below with respect to FIG. 6.

It will be understood that although embodiments of the present invention discussed herein include two transmission amplifiers 301 and 302 and four receivers 370, 371, 372 and 373 coupled to a single antenna 380 through a diplexer 350, embodiments of the present invention are not limited to this configuration. Transceivers according to some embodiments of the present invention may include more or less transmission amplifiers and/or receivers without departing from the teachings of the present invention.

The PIN diode 310, 311 discussed above may cause the circuit illustrated in FIG. 3 to experience losses when the wireless terminal is transmitting communications from the transmission amplifier 301, 302. Accordingly, the inductive elements L2 and L4 and the capacitors C1 and C2 are selected such that they provide a relatively high impedance together with an output transistor (not shown) of the transmission amplifiers 301 and 302 and, thus, may not significantly affect a received signal when the wireless terminal is receiving communications at a receiver.

In certain embodiments of the present invention, the PIN diode 310, 311 may be replaced by, for example, a microstrip for fine-tuning, i.e. to minimize the impact of the transmission amplifiers 301 and 302 on a received signal when the wireless terminal is receiving communications at a receiver. However, if the inductors L2 and L4 and the capacitors C1 and C2 are in parallel resonance at a carrier frequency, the microstrip may not be needed.

When one of the receivers illustrated in FIG. 3 is activated by turning off the switch 330, 331, 332 and/or 333 associated with the desired receive path the other radio frequency (RF) switch sharing the transmission amplifier is typically turned on so that it will not divert power from the desired path. Switching circuits 330 through 333 according to some embodiments of the present invention may include switches that are voltage controlled and, thus may not consume significant current and/or power. This type of switch may be provided by, for example, a field effect transistor (FET) as discussed further below.

It will be understood that although embodiments of the present invention are discussed with respect to metal oxide semiconductor field effect transistors (MOSFETs), embodiments of the present invention are not limited to this configuration. For example, metal semiconductor field effect transistors (MESFETs), junction field effect transistors (JFETs) and/or pseudomorphic high-electron-mobility transistors (PHEMTs) may also be used in combination with HBTs, MESFETs, JFETs or PHEMTs on a Gallium Arsenide (GaAs) substrate to provide a switching circuit that also does not consume significant current through a control gate. Embodiments of the present invention utilizing one or more of these alternatives may be more costly than embodiments of the present invention utilizing MOSFETs configured as switches as discussed herein.

Figure 4:
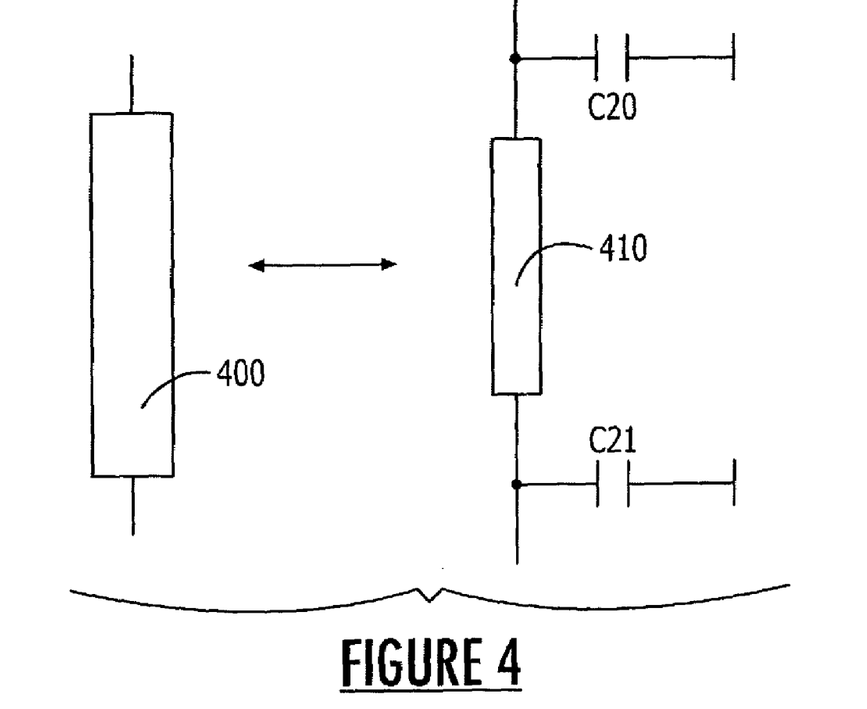
FIG. 4 is a schematic diagram of transmission lines used in transceivers according to some embodiments of the present invention.

Referring now to FIG. 4, an alternative embodiment of transmission lines according to some embodiments of the present invention will be discussed. In some embodiments of the present invention a length of a transmission line or microstrip may be shortened by replacing the existing transmission line with an equivalent transmission line as illustrated in FIG. 4. In particular, transmission lines according to some embodiments of the present invention can be implemented as lumped elements or a combination of lumped elements and transmission lines. For example, the 90 degree transmission line 400 illustrated in FIG. 4 may be replaced by a shorter transmission line 410. The difference in length may be compensated for by adding capacitance at the input and/or output of the transmission line 410. As illustrated in FIG. 4, the difference in length is compensated for by adding capacitor C20 to the input of the shorter transmission line and the capacitor C21 at the output of the shorter transmission line. It will be understood that transmission lines according to some embodiments of the present invention may also be lengthened using the reverse process, i.e. transmission line 410 and capacitors C20 and C21 can be replaced by the longer transmission line 400. Accordingly, for example, transmission line 320, capacitor C3 and capacitor Cds of FIG. 3 may be replaced by a longer transmission line as illustrated in FIG. 4.

As discussed above, FETs may be configured as switches and included in switching circuits 330, 331, 332, 333 described above with respect to FIG. 3. FET switches according to some embodiments of the present invention operate responsive to a control voltage, thus, these switches may reduce current and/or power consumption. However, FET switches may handle a relatively limited voltage swing, have a high coupling to a silicon (Si) substrate and have a high capacitance from the drain to the source. Embodiments of the present invention address these characteristics of MOSFET switches as discussed below.

It will be understood that MOSFETs discussed herein may be, for example, an n-channel (NMOS) or a p-channel (PMOS) MOSFET. Embodiments of the present invention will be discussed herein using NMOS transistors, but it will be understood that embodiments of the present invention are not limited to this configuration. NMOS transistors may have half the resistance of a PMOS transistor having the same gate length. However, NMOS transistors may be fabricated in a Pwell that is in direct contact with the rest of the substrate.

When utilizing NMOS transistors as switches according to some embodiments of the present invention, a parasitic capacitance from the drain to the source of the NMOS transistor can be reduced so that the switch can operate at higher frequencies. The parasitic capacitance from the drain to the source of the NMOS transistor may be reduced by decreasing capacitances that make up the capacitance from the drain to the source. For example, one part of the capacitance from the drain to the source of the transistor include the gate to drain and gate to source capacitances. By controlling the gate through a high ohmic device or resistive element, such as a resistor, it is possible that the effective drain to source capacitance through the gate may become half the gate to drain capacitance, since the gate to source and gate to drain capacitances are put in series.

Additional components of the capacitance from the drain to the source of the transistor include the drain to substrate and the source to substrate capacitance. It may be possible to halve these capacitances as well, by providing a high ohmic contact from the Pwell to ground, i.e. grounding the Pwell to the substrate having a substrate resistance $R_{sub}$. It will be understood that methods of decreasing the parasitic drain to source capacitance according to some embodiments of the present invention may reduce the drain to source capacitance to provide a decreased drain to source capacitance, but that the drain to source capacitance may still degrade the switch performance at high frequencies. Circuit configurations that may address the remaining drain to source capacitance in the circuit will be discussed further below.

Radiation patterns for antennas are often plotted using polar coordinates. Voltage Standing Wave Ratio (VSWR) relates to the impedance match of an antenna feed point with a feed line or transmission line of a communications device, such as a wireless terminal. To radiate radio frequency energy with minimum loss, or to pass along received radio frequency (RF) energy to a wireless terminal receiver with minimum loss, the impedance of a wireless terminal antenna is conventionally matched to the impedance of a transmission line or feed point.

Figure 5:
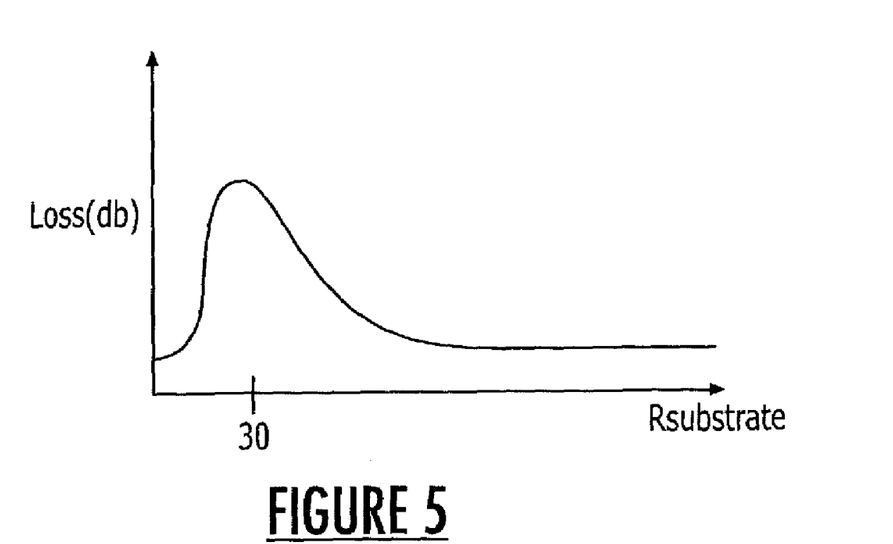
FIG. 5 is a chart illustrating substrate resistances versus losses in dB according to some embodiments of the present invention.

Referring now to FIG. 5, a chart illustrating substrate resistances versus loss (dB) will be discussed. As illustrated in FIG. 5, when using NMOS transistors according to some embodiments of the present invention, the resistance of the substrate may be kept high because the higher the resistance of the substrate the lower the loss (dB). In certain embodiments of the present invention, the resistance of the substrate ($R_{sub}$) is set to about 300 ohms. As further illustrated by the chart in FIG. 5, it is possible to get an adequate performance when the substrate contact has a resistance of 0 ohms, but at this resistance, the slightest increase in substrate contact resistance will degrade performance. If a contact resistance of 300 ohms is used, an increase in contact resistance may not substantially affect the performance of the switch. It will be understood that according to some embodiments of the present invention, the substrate may be well grounded so that the rest of the circuit will function correctly.

Figure 6:
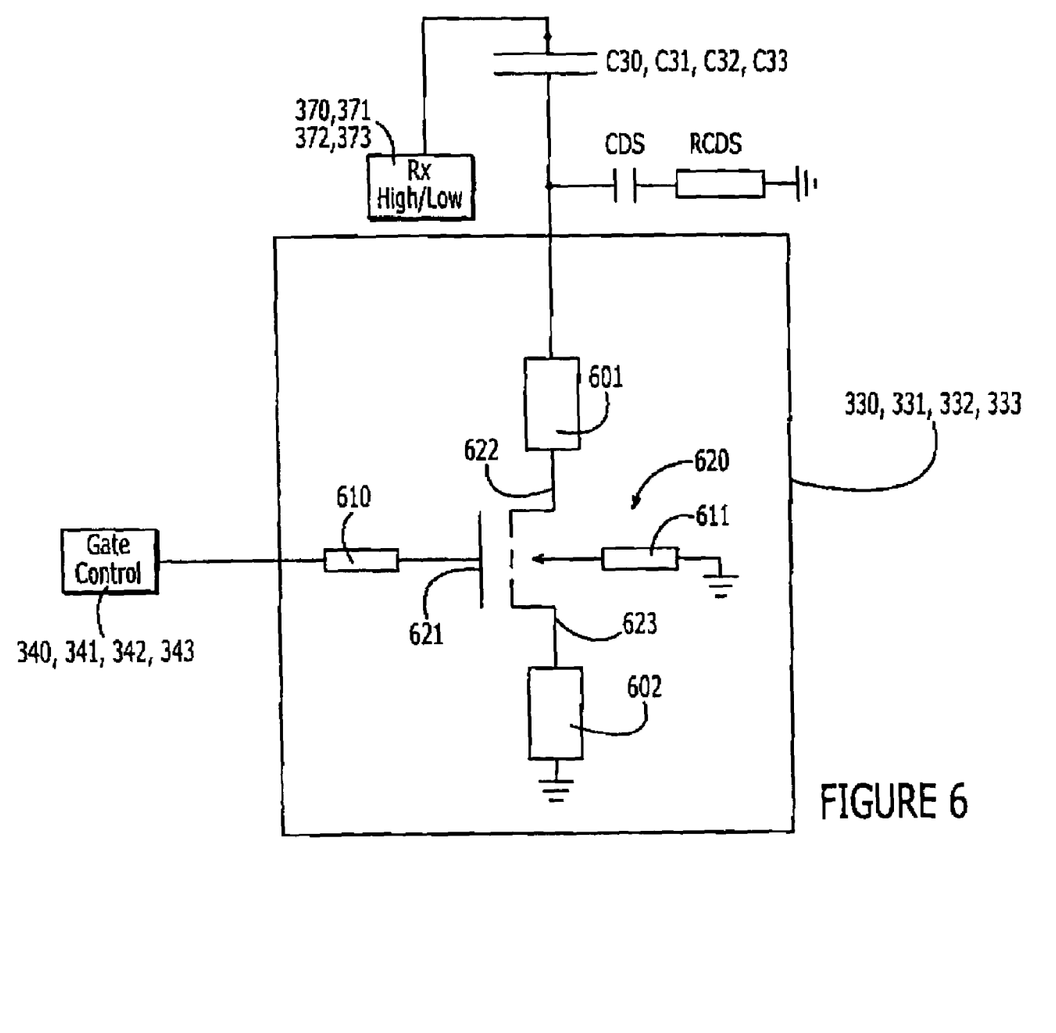
FIG. 6 is a schematic block diagram of switching circuits included in transceivers according to some embodiments of the present invention.

Referring now to FIG. 6, a switching circuit 330, 331, 332, 333 according to some embodiments of the present invention will be discussed. In the interest of brevity, only one receiver signal path A, B, C or D and one transmitter signal path E or F of FIG. 3 will be discussed because each path contains similar components. It will be understood that the values of these components may vary because each path is dedicated to a different frequency band as discussed above. As illustrated in FIG. 6, the switching circuit 330, 331, 332, 333 includes a field effect transistor 620 that is coupled between the receiver input of the receiver 370, 371, 372, 373 and an input terminal of the capacitor Cds and an electrical reference, for example, ground. The receiver 370, 371, 372, 373 may be a high band or a low band receiver discussed above. It will be understood that the receiver 370, 371, 372, 373 may be a receive port that includes, for example, filters and capacitors, that may facilitate communication with additional circuits in the wireless terminal, for example, controller 25 of FIG. 2.

In particular, in embodiments of the present invention illustrated in FIG. 6, the switching circuit 330, 331, 332, 333 includes an NMOS transistor 620. The methods discussed above for reducing the source to drain capacitance of the NMOS transistor have been employed in the embodiments of the present invention illustrated in FIG. 6. For example, a gate 621 of the NMOS transistor 620 is controlled through a high ohmic device and/or resistive element, for example, resistor 610, to reduce the drain to source capacitance of the NMOS transistor as discussed above. The resistor may also be useful in reducing the gate to source and gate to drain capacitances. The resistor 610 also isolates the gate control voltage 340, 341, 342, 343 from the gate 621 of the NMOS transistor 620 to reduce the influence of the gate control voltage 340, 341, 342, 343 on the RF signal of the NMOS transistor.

Furthermore, a channel region of the NMOS transistor 620 has been coupled to ground through the backside of the substrate. In particular, the Pwell of the NMOS transistor has been grounded to the substrate, which has as a resistance $R_{sub}$ 611. The substrate resistance may be about 300 ohms as discussed above with respect to FIG. 5. Thus, the capacitor Cds may have a capacitance equal to the capacitance of the drain to source resistance of the NMOS transistor 620 that has been decreased by the methods discussed above. As illustrated in FIG. 6, the capacitor Cds is typically not an ideal capacitor and therefore exhibits some parasitic resistance Rcds (the resistance of the drain to the source capacitance of the field effect transistor).

The drain 622 of the NMOS transistor 620 is coupled to the transmission line 320, 321, 322, 323 (not shown) through a capacitor C30, C31, C32, C33 so that the PIN diode 310, 311 (not shown) can be controlled by driving a DC voltage through the transmission line 320, 321, 322, 323. The capacitor C30, C31, C32, C33 shields the NMOS transistor 620 from the DC voltage. The capacitor C30, C31, C32, C33 typically has a very large capacitance so that it does not degrade the performance of the switching circuit 330, 331, 332, 333.

Transmission lines 601 and 602 represent the length of wire between the drain 622 and the source 623 of the NMOS transistor 620. If the transmission lines 601 and 602 are chosen to have a series resonance when the receiving path is operational, the value of C30, C31, C32, C33 may be easier to implement. For example, if the receiving band is at a frequency of 1800 MHz, C30, C31, C32, C33 may be set to 10 pF and the corresponding inductance of the transmission lines 601 and 602 would be about 0.78 nH (inductance of transmission line 601+inductance of transmission line 602). It will be understood that transmission lines 601 and 602 may be combined into a single transmission line as discussed above with respect to FIG. 4. The single transmission line may be coupled to either the source 623 or the drain 622 of the NMOS transistor 620 without departing from the teachings of the present invention. Furthermore, in certain embodiments, the transmission lines 601 and 602 may be replaced by, for example, inductive elements or microstrips.

Operations of the field effect transistor illustrated in FIG. 6 will now be discussed with respect to FIG. 6. The NMOS transistor 620 is configured to provide an open circuit when receiving communications at the receiver input of the receiver 370, 371, 372, 373 and to provide a closed circuit when not receiving communications at the receiver input of the receiver 370, 371, 372, 373. In particular, when the gate controller 340, 341, 342 and 343 asserts a voltage, the NMOS transistor 620 turns on and is effectively a resistor. This causes the transmission line 320, 321, 322, 323 (not shown) and capacitor C3, C4, C5, C6 to effectively become a high ohmic device. This essentially disconnects the receive path because signals flow on the path of least resistance, which in this case is to the antenna 380 (not shown) for transmission. On the other hand, when the gate control voltage 340, 341, 342, 343 is not asserted, the NMOS transistor 620 turns off. This causes the resistance of the receive path to decrease and signals on the path from the antenna 380 (not shown) to be diverted to the receiver 370, 371, 372, 373. Furthermore, the PIN diode 310, 311 also isolates the transmission amplifier 301, 302 and the transmit path from the receive signals when the NMOS transistor 620 is turned off.

Figure 7:
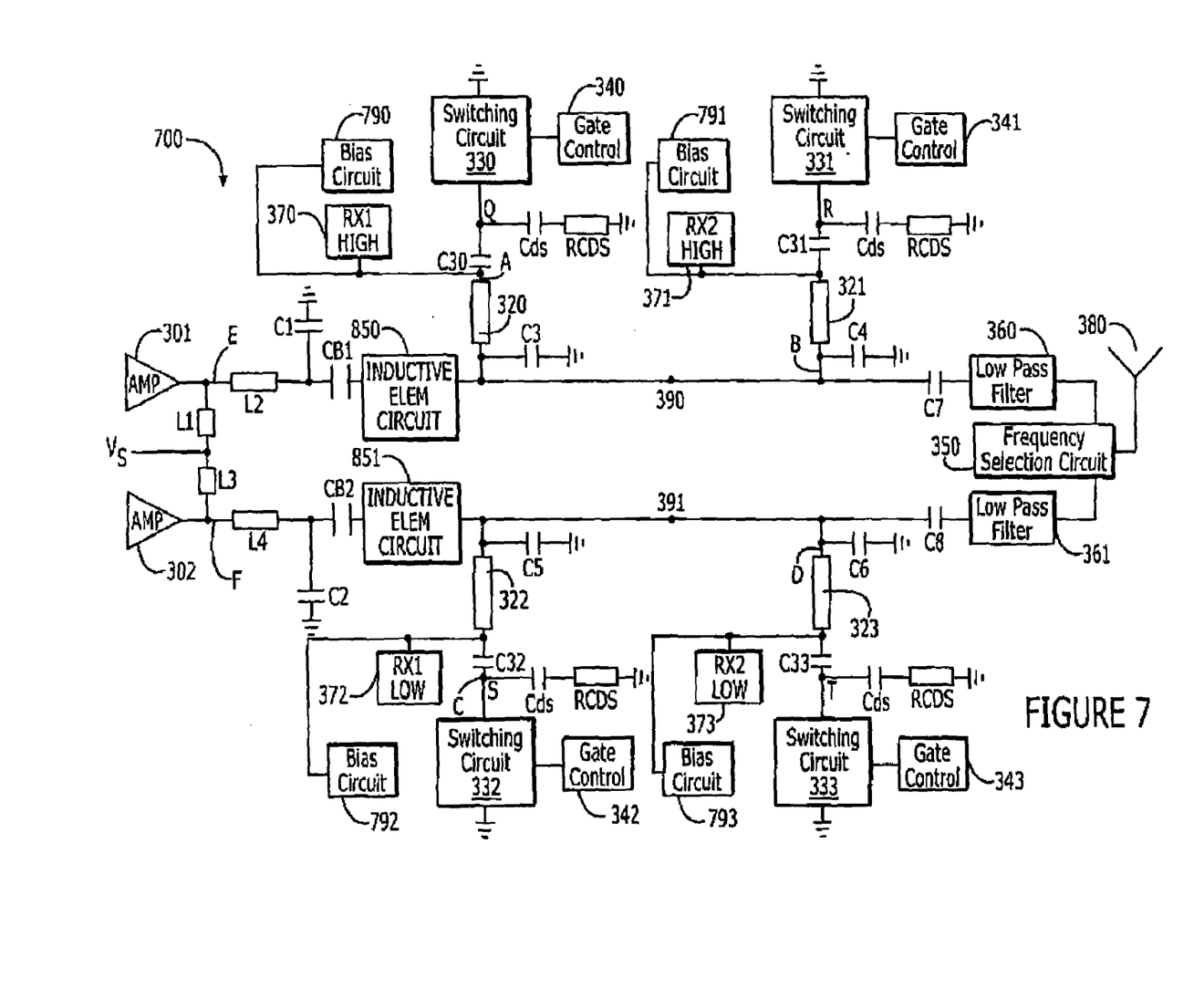
FIG. 7 is a block diagram of transceivers according to some embodiments of the present invention.

Referring now to FIG. 7, a transceiver including circuits for biasing and/or controlling the isolation circuit according to some embodiments of the present invention will be discussed. Details with respect to components of the transceiver 700 discussed with respect to FIG. 3 will be omitted from the discussion of FIG. 7 as the details of these components are set out above. One receiver signal path and one transmitter signal path will be discussed because the each of the receiver paths and transmitter paths include similar components. It will be understood that the components in the receiver and transmitter signal paths may have different values to compensate for the different frequencies that are associated with each path. As illustrated in FIG. 7, transceiver 700 further includes an inductive element circuit 850, 851 and a DC blocking capacitor CB1, CB2 coupled in series between the capacitor C1, C2 and an antenna input/output node 390, 391. Furthermore, a Bias circuit 790, 791, 792, 793 is coupled to a node Q, R, S and T between the transmission line 320, 321, 322, 323 and the switching circuit 330, 331, 332, 333.

Bias circuits 790, 791, 792 and 793 according to some embodiments of the present invention are configured to provide a low impedance at the isolation device 310, 311 (FIG. 3) when transmitting communications from the transmission amplifier 301, 302 and to provide a high impedance at the isolation device 310, 311 (FIG. 3) when communications are not being transmitted from the transmission amplifier 301, 302. Accordingly, when the wireless terminal is receiving communications at the receiver the bias circuit provides a high impedance at the isolation device. It will be understood that the wireless terminal according to some embodiments of the present invention may also be idle, not transmitting or receiving communications. Inductive element circuits 850 and 851 provide a resistive coupling of a transmission amplifier output as discussed further below with respect to FIGS. 8A, 8B, 9A and 9B. The DC blocking capacitor CB1, CB2 shields the $V_s$ from the inductive element circuit 850, 851.

Figure 8A:
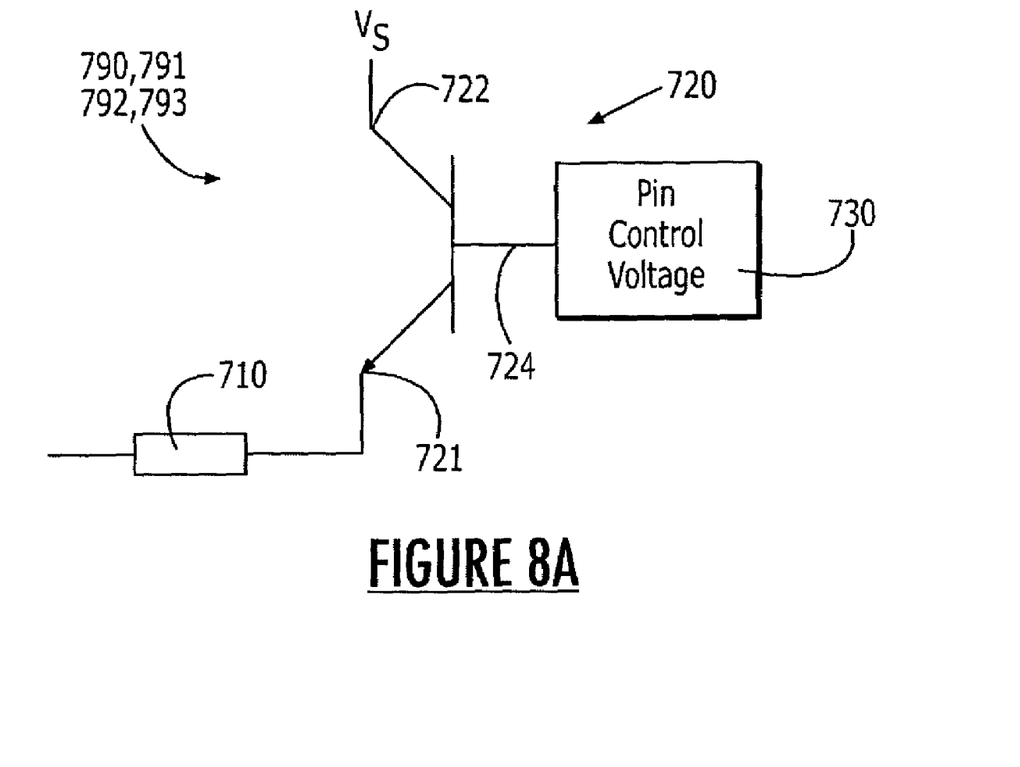
FIGS. 8A and 8B are schematic block diagram of bias circuits and inductive element circuits included in transceivers according to some embodiments of the present invention.
Figure 8B:
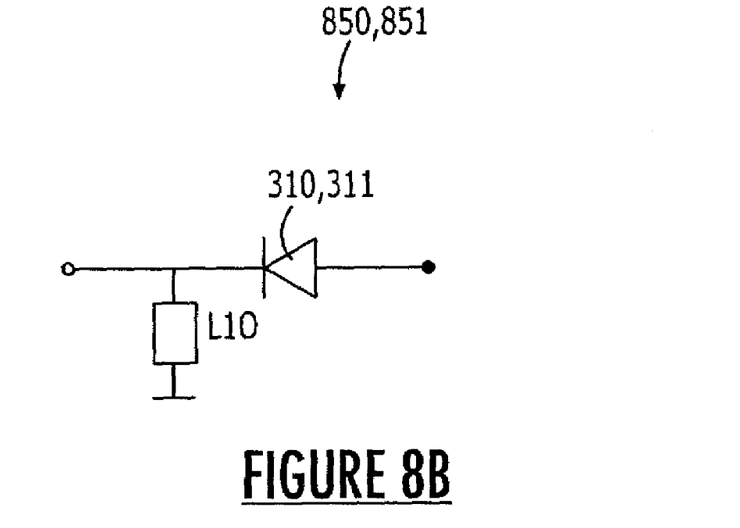

Referring now to FIGS. 8A and 8B, bias circuits 790, 791, 792, 793 according to some embodiments of the present invention may include a bipolar transistor 720 and a PIN control voltage 730. Inductive element circuits 850, 851 may include an inductive element L10 and PIN diode 310, 311. The PIN diode 310, 311 may be put in reverse and a terminal of the PIN diode 310, 311 is coupled to the inductive element L10 that is also connected to ground. The bipolar transistor 720 has its emitter 721 electrically coupled to the receiver 370, 371, 372, 373 at a receiver input through a resistor 710, a collector 722 electrically coupled to $V_s$ and a base 724 electrically coupled to the PIN control voltage 730.

Operations of the bias circuit will now be discussed with respect to FIGS. 8A and 8B. A resistive coupling of the transmission amplifier output to ground is provided by the inductive element L10. The bias circuit 790, 791, 792, 793 is further configured to couple the antenna input/output node 390, 391 to a supply voltage when transmitting communications from the transmission amplifier 301, 302 and to decouple the antenna input/output node 390, 391 from the supply voltage when not transmitting communications from the transmission amplifier 301, 302. Thus, when the switching circuit 330, 331, 332, 333 turns the NMOS transistor on, the receive path is essentially turned off. At this point, the signal tries to flow through the PIN diode 310, 311 from the transmission amplifier 301, 302 to the antenna 380 (not shown), but may not be able to flow. Accordingly, a pin control voltage 730 is asserted in the bias circuit and the bipolar transistor 720 turns on, which couples the antenna input/output node 390, 391 to the supply voltage and allows the RF signals to flow through the PIN diode 310, 311 to the antenna 380.

Figure 9A:
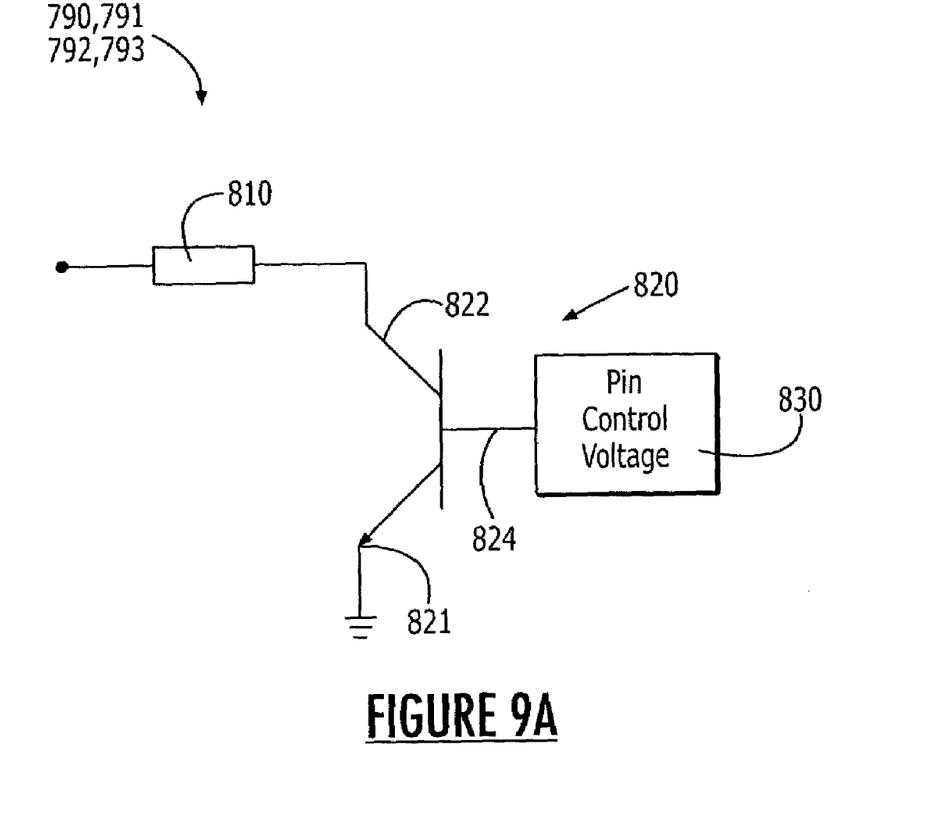
FIGS. 9A and 9B are schematic block diagrams of bias circuits and inductive element circuits included in transceivers according to some embodiments of the present invention.
Figure 9B:
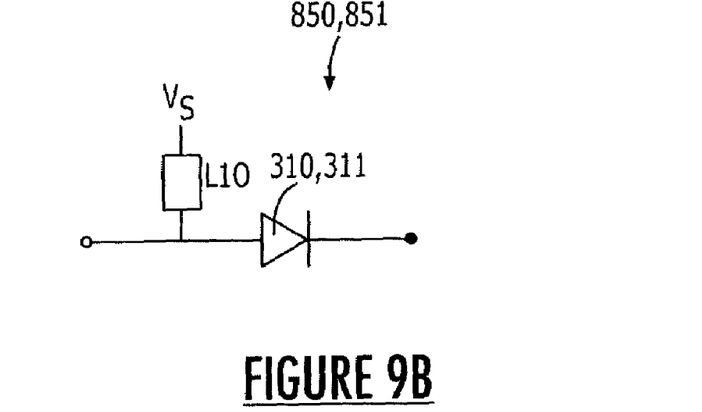

Referring now to FIGS. 9A and 9B, bias circuits 790, 791, 792, 793 according to some embodiments of the present invention may include a bipolar transistor 820 and a PIN control voltage 830. Inductive element circuits 850, 851 may include an inductive element L10 and PIN diode 310, 311. The inductive element L10 is electrically coupled to $V_s$. When $V_s$, a DC voltage, for example, the voltage of the phone battery, is asserted, the inductive element L10 is pulled up to $V_s$. An input terminal of the PIN diode 310, 311 is connected to the DC voltage, which allows DC voltage to flow on the transmit path. The collector 822 of the bipolar transistor 820 is connected to the receiver 370, 371, 372, 373 through a resistor 810. The emitter 821 of the bipolar transistor is connected to the substrate (ground) and the base 824 of the bipolar transistor is connected to the PIN control voltage 830. Embodiments of the bias circuit illustrated in FIG. 8A may further reduce leakage caused by RF-noise relative to the embodiments illustrated in FIG. 9A, because the emitter 721 of the transistor 720 is not directly connected to the substrate (ground) in FIG. 8A, therefore the RF-noise generated by the power amplifier through injected current in the silicon substrate may be inhibited.

Operations of the bias circuit will now be discussed with respect to FIGS. 9A and 9B. A resistive coupling of the transmission amplifier output to a source voltage is provided by the inductive element L10. The bias circuit is further configured to couple the antenna input/output node 390, 391 to ground when transmitting communications from the transmission amplifier 301, 302 and to decouple the antenna input/output node 390, 391 from ground when not transmitting communications from the transmission amplifier 301, 302. Thus, when the switching circuit 330, 331, 332, 333 turns the FET on, the receive path is essentially turned off. At this point, the signal tries to flow through the PIN diode 310, 311 to be transmitted from the antenna 380 (not shown), but may not be able to flow. Accordingly, a pin control voltage 830 is asserted in the bias circuit and the bipolar transistor 720 turns on, which couples the antenna input/output node 390, 391 to ground and allows the RF signals to flow through the PIN diode 310, 311 to the antenna 380.

Figure 10:
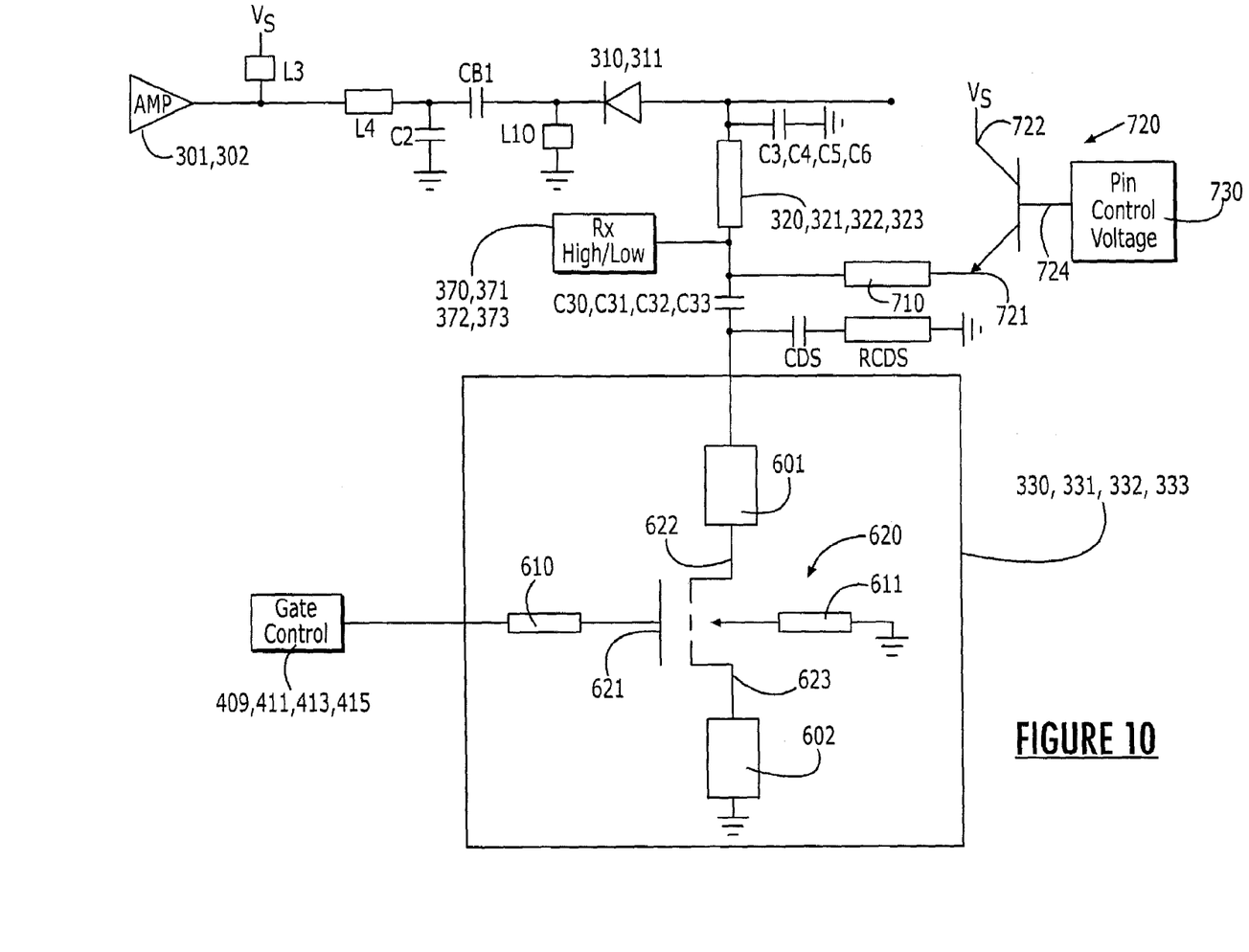
FIG. 10 is a schematic block diagram of transceivers including switching circuits and biasing circuits according to some embodiments of the present invention.

It will be understood that embodiments of the bias circuits and inductive element circuits provided in FIGS. 7 through 9B may be combined with embodiments of the switching circuit illustrated in, for example, FIG. 6. An exemplary configuration of the combination of a bias circuit and inductive element circuit with a switching circuit according to some embodiments of the present invention is illustrated in FIG. 10. Discussions of operations of the circuit illustrated in FIG. 10 will not be discussed herein in the interest of brevity as the operations are discussed above with respect to FIGS. 6 through 9B. It will be understood that the although FIG. 10 illustrates embodiments of the bias circuit and the inductive element circuit illustrated in FIGS. 8A and 8B combined with embodiments of the switching circuit illustrated in FIG. 6, embodiments of the invention are not limited to this configuration. Integrating these teachings may provide a transceiver that includes a switching circuit including a FET and a biased isolation circuit that allows RF signals to flow during transmit operations.

As described above with respect to FIGS. 1 through 10, embodiments of the present invention provide an antenna switch that may be integrated on a same integrated circuit chip, such as a same integrated circuit semiconductor substrate, with an amplifier for use in communications devices, for example, wireless terminals. In particular, an antenna switch can be provided including a field effect transistor (FET) configured to switch a wireless terminal from transmitting communications from a transmission amplifier to receiving communications at a receiver. FETs configured as switches according to some embodiments of the present invention are activated and/or deactivated responsive to a voltage control signal. Antenna switches according to some embodiments of the present invention operate responsive to a voltage control signal such that the switches may not draw significant current, these devices may have improved performance characteristics relative to conventional antenna switches. According to some embodiments of the present invention, switches may be combined with transmission amplifiers on a single chip, thus, providing a smaller, integrated package that may be more cost effective relative to existing antenna switches.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A transceiver circuit comprising:
    a transmission amplifier coupled with an antenna input/output node wherein the transmission amplifier is configured to amplify communications to be transmitted from the transceiver circuit;
    a receiver including a receiver input coupled with the antenna input/output node;
    a capacitor coupled between the antenna input/output node and an electrical reference;
    a field effect transistor being integrated on a same semiconductor chip as the transmission amplifier and being coupled between the receiver input and the electrical reference wherein the field effect transistor is configured to provide an open circuit when receiving communications at the receiver input and wherein the field effect transistor is configured to provide a closed circuit when not receiving communication at the receiver input;
    a PIN diode coupled between the transmission amplifier and the antenna input/output node and between the transmission amplifier and the receive input, the PIN diode adapted to isolate the transmission amplifier from the antenna input/output node and isolate the transmission amplifier from the receive input; and
    a bias circuit coupled with the antenna input/output node wherein the bias circuit is configured to provide a low impedance at the PIN diode when transmitting communications from the transmission amplifier and to provide a high impedance at the PIN diode when communications are not being transmitted from the transmission amplifier, the bias circuit adapted to provide a path in the transmit mode to the antenna input/output node via a microstrip coupled to the receiver input, wherein the capacitor, the microstrip and the closed field effect transistor provide a high impedance.

2. A transceiver circuit according to claim 1 wherein the transceiver circuit is integrated in a communications device.

3. A transceiver circuit according to claim 1 wherein the bias circuit comprises resistive coupling of the transmission amplifier output to a source voltage and a switch configured to couple the antenna input/output node to ground when transmitting communications from the transmission amplifier and configured to decouple the antenna input/output node from ground when not transmitting communications from the transmission amplifier.

4. A transceiver circuit according to claim 1 wherein the bias circuit comprises a resistive coupling of the transmission amplifier output to ground and a switch configured to couple the antenna input/output node to a supply voltage when transmitting communications from the transmission amplifier and configured to decouple the antenna input/output node from the supply voltage when not transmitting communications from the transmission amplifier.

5. A transceiver circuit according to claim 1 further comprising a resistive element coupled to a gate of the field effect transistor wherein the field effect transistor is responsive to an input signal applied though the resistive element coupled to the gate thereof, said resistive element being operable to reduce the drain to source capacitance of the field effect transistor.

6. A transceiver circuit according to claim 1 wherein the capacitor has a capacitance that is approximately equal to a drain to source capacitance of the field effect transistor.

7. A transceiver circuit according to claim 1 further comprising:
    a second receiver including a second receiver input coupled with the antenna input/output node; and
    a second field effect transistor coupled between the second receiver input and the electrical reference wherein the second field effect transistor is configured to provide an open circuit when receiving communications at the second receiver input and wherein the field effect transistor is configured to provide a closed circuit when not receiving communications at the second receiver input.

8. A transceiver circuit according to claim 7 wherein the first and second field effect transistors are further configured to provide the closed circuit when transmitting communications from the transmission amplifier.

9. A transceiver circuit according to claim 1 further comprising:
    a second transmission amplifier coupled with a second antenna input/output node wherein the second transmission amplifier is configured to amplify communications to be transmitted from the transceiver circuit;
    a frequency selection circuit coupled between the first and second antenna input/output nodes wherein the frequency selection circuit is configured to couple frequencies in a first frequency band to/from the first antenna input/output node and to couple frequencies in a second frequency band to/from the second antenna input/output node;
    a second receiver including a receiver input coupled with the antenna input/output node; and
    a second field effect transistor coupled between the second receiver input and the electrical reference wherein the second field effect transistor is configured to provide an open circuit when receiving communications at the second receiver input and wherein the second field effect transistor is configured to provide a closed circuit when not receiving communications at the second receiver input.

10. A transceiver circuit according to claim 1, wherein the electrical reference is ground.

11. A transceiver circuit according to claim 1, wherein a capacitance of the capacitor is replaced by a drain to source capacitance of the field effect transistor.

12. A transceiver circuit comprising:
a transmission amplifier coupled with an antenna input/output node wherein the transmission amplifier is configured to amplify communications to be transmitted from the transceiver circuit;
a receiver including a receiver input coupled with the antenna input/output node;
a PIN diode coupled between the transmission amplifier and the antenna input/output node and between the transmission amplifier and the receiver input the PIN diode adapted to isolate the transmission am amplifier from the antenna input/output node and isolate the transmission amplifier from the receive input;
a bias circuit coupled with the antenna input/output node wherein the bias circuit is configured to provide a low impedance at the PIN diode when transmitting communications from the transmission amplifier and to provide a high impedance at the PIN diode when communications are not being transmitted from the transmission amplifier, the bias circuit adapted to provide a path in the transmit mode to the antenna input/output node via a microstrip coupled to the receiver input;
a capacitor coupled between the antenna input/output node and an electrical reference; and
a field effect transistor being integrated on a same semiconductor chip as the transmission amplifier and being coupled between the receiver input and an electrical reference wherein the field effect transistor is configured to provide an open circuit when receiving communications at the receiver input and wherein the field effect transistor is configured to provide a closed circuit when not receiving communications at the receiver input.

13. A transceiver circuit according to claim 12 wherein the bias circuit comprises a resistive coupling of the transmission amplifier output to a source voltage and a switch configured to couple the antenna input/output node to ground when transmitting communications from the transmission amplifier and configured to decouple the antenna input/output node from ground when not transmitting communications from the transmission amplifier.

14. A transceiver circuit according to claim 13 wherein the switch is further configured to decouple the antenna input/output node from ground when receiving communications at the receiver.

15. A transceiver circuit according to claim 12 wherein the bias circuit comprises a resistive coupling of the transmission amplifier output to ground and a switch configured to couple the antenna input/output node to a supply voltage when transmitting communications from the transmission amplifier and configured to decouple the antenna input/output node from the supply voltage when not transmitting communications from the transmission amplifier.

16. A transceiver circuit according to claim 15 wherein the switch is further configured to decouple the antenna input/output node from a supply voltage when receiving communications at the receiver.

17. A transceiver circuit according to claim 12 further comprising:
a resistive element coupled to a gate of the field effect transistor wherein the field effect transistor is responsive to an input signal applied through the resistive element coupled to the gate thereof, said resistive element being operable to reduce the drain to source capacitance of the field effect transistor.

18. A transceiver circuit according to claim 12 wherein the capacitor has a capacitance that is approximately equal to a drain to source capacitance of the field effect transistor.

19. A transceiver circuit according to claim 12 further comprising:
a second receiver including a second receiver input coupled with the antenna input/output node; and
a second bias circuit coupled with the antenna input/output node wherein the second bias circuit is configured to provide a low impedance at the PIN diode when transmitting communications from the transmission amplifier and to provide a high impedance at the PIN diode when communications are not being transmitted from the transmission amplifier.

20. A transceiver circuit according to claim 12 further comprising:
a second transmission amplifier coupled with a second antenna input/output node wherein the second transmission amplifier is configured to amplify communications to be transmitted from the transceiver circuit
a frequency selection circuit coupled between the first and second antenna input/output nodes wherein the frequency selection circuit is configured to couple frequencies in a first frequency band to/from the first antenna input/output node and to couple frequencies in a second frequency band to/from the second antenna input/output node;
a second receiver including a second receiver input coupled with the second antenna input/output node;
a second PIN diode coupled between the second transmission amplifier and the second antenna input/output node and between the second transmission amplifier and the second receiver input;
a second bias circuit coupled with the second antenna input/output node wherein the second bias circuit is configured to provide a low impedance at the second PIN diode when transmitting communications from the second transmission amplifier and to provide a high impedance at the second PIN diode when communications are not being transmitted from the second transmission amplifier.

21. A transceiver circuit according to claim 12 wherein the transceiver circuit is integrated in a communications device.

* * * * *